July 1, 1958  L. A. RUNTON  2,841,515
CONVEYOR BELTS
Filed May 18, 1956  2 Sheets-Sheet 1
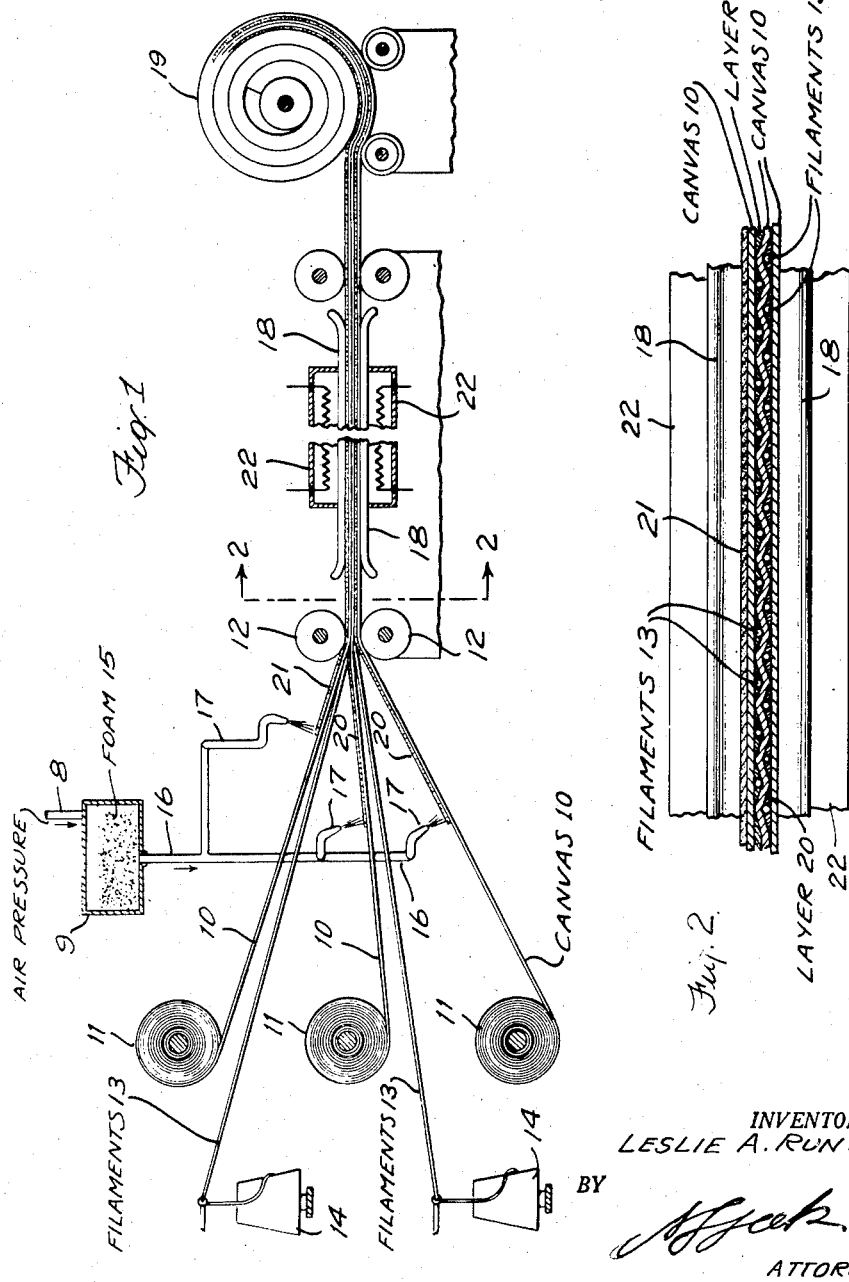
INVENTOR.
LESLIE A. RUNTON
BY
ATTORNEY July 1, 1958 L. A. RUNTON 2,841,515
CONVEYOR BELTS
Filed May 18, 1956 2 Sheets-Sheet 2
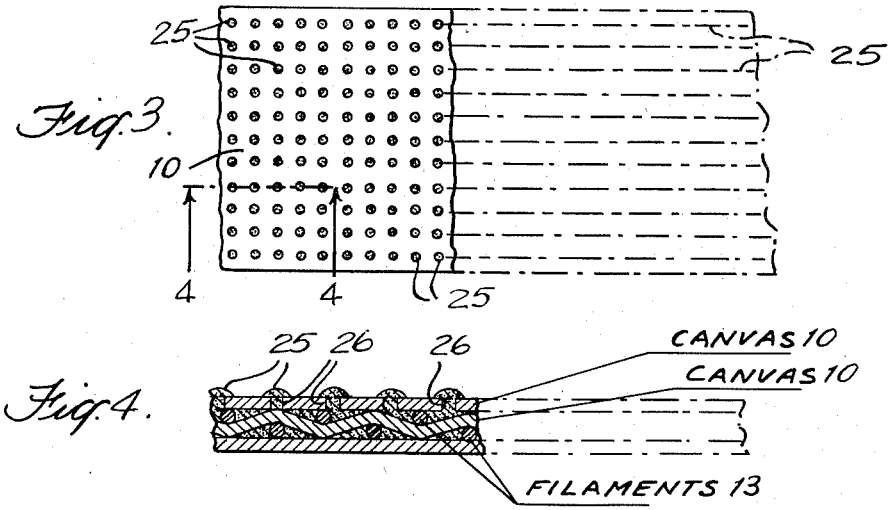
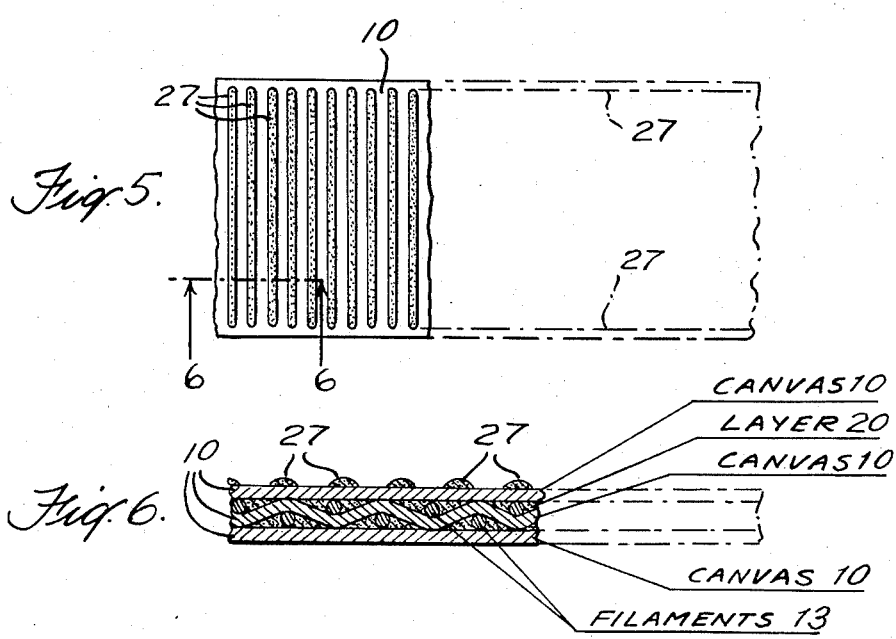
INVENTOR.
LESLIE A. RUNTON
BY
ATTORNEY United States Patent Office 2,841,515
Patented July 1, 1958

2,841,515

CONVEYOR BELTS

Leslie A. Runton, Middle Haddam, Conn., assignor to The Russell Manufacturing Company, Middletown, Conn., a corporation of Connecticut Application May 18, 1956, Serial No. 585,716

4 Claims. (Cl. 154—52.1)

This invention relates to conveyor belts and has for an object to provide a belt having novel and improved characteristics.

Another object is to provide an improved method of making such a belt.

Another object is to provide a dimensionally stable belt having improved wearing qualities.

Another object is to provide a belt without folding and stitching.

Another object is to provide a conveyor belt having integrally formed surface cleats for positioning the article being conveyed.

In accordance with the present invention the belt is made by laminating layers of canvas with dimensionally stable commercial synthetic filaments disposed therebetween and with the layers adhered together by a synthetic foam having bonding properties. A layer of such foam is also placed on the face of the belt when required for a protective coating to prevent cutting or tearing of the belt when sharp or hard objects are conveyed thereby. Cleats or pins of soft material, such as synthetic foam are also disposed along a surface of the belt for positioning and for preventing the articles from sliding along the belt, particularly when being conveyed up an incline.

The canvas layers may be made of thinner material than that normally used for a belt of the same strength. Added tensile strength is obtained by the use of the dimensionally stable synthetic filaments which are preferably in continuous filament form although fibers embedded in a suitable bonding agent may be used.

The filaments may comprise prestretched, high tenacity rayon tire cord or prestretched nylon tire cord which have a high degree of dimensional stability and a high tensile strength.

The filaments are embedded in a synthetic foam such as polyurethane of the iso-cyanate group which has the property of forming a foam during curing. The above foaming agent also has the adhesive properties required for bonding the various layers together.

The invention will be better understood by referring to the accompanying drawing in which:

Fig. 1 is a diagrammatic view of an apparatus for making the improved belt;

Fig. 2 is a sectional view of a belt embodying the invention, taken on the line 2—2 of Fig. 1;

Fig. 3 is a broken plan view of a belt having integrally formed positioning pins projecting above the surface thereof;

Fig. 4 is a section taken on the line 4—4 of Fig. 3;

Fig. 5 is a broken plan view similar to Fig. 3 showing a belt having positioning cleats thereon; and Fig. 6 is a section taken on the line 6—6 of Fig. 5.

Referring to Fig. 1 a plurality of layers of canvas webs 10 are fed from rolls 11 between squeeze rolls 12. Sheets of filaments 13 are fed from creels 14 between each pair of canvas layers 10. Synthetic foam 15 is fed from tank 9, maintained under pressure by air from pipe 8, through pipes 16 and nozzles 17 onto the webs 10 and onto the top face of the belt to form layers 20 and 21 thereof in advance of the squeeze rolls 12.

The squeeze rolls 12 are arranged to squeeze out any excess of foam material to form a laminated product of the desired thickness.

After passing the squeeze rolls 12 the product is passed between plates 18 which maintain the product at the required thickness and exert the necessary pressure for bonding the layers together and which are provided with heating means 22 to heat the foam to curing temperature. The bonded web is wound upon a roll 19.

The product as shown in Fig. 2 includes layers 10 of canvas, filaments 13 and intermediate layers 20 of the foam. An additional layer of foam 21 is shown as disposed on the face of the belt but may be omitted if surface protection is not required.

The above belt has a high tensile strength and a high degree of dimensional stability due to the filaments 13. The foam layers 20 are compressed to take up the strain on the fabric layer as the belt passes around rolls and the surface layer 21 of foam protects the belt against injury during use.

The belt can be slit into narrow widths if desired.

Synthetic staple fibers can be embedded in the foam layers to replace the continuous filaments if desired although the dimensional stability is usually improved by using untwisted continuous filament bundles of the type above mentioned.

In the embodiment of Figs. 3 and 4 the belt is composed of canvas layers 10, filaments 13 and intermediate layers 20 of foam as in Fig. 2. In Figs. 3 and 4 however the surface layer of synthetic foam is omitted and pins 25 of foam are formed by squeezing the foam from the intermediate layer 20 through holes 26 in the top layer 10 of canvas into suitable molds and curing as above described to provide a belt having an upper layer of canvas with integrally formed pins or pegs of soft foam. The pins 25 may be joined above the canvas to form cleats 27 as shown in Fig. 5.

The pins 25 or cleats 27 serve to position objects on the belt without the danger of injuring delicate objects which would result from the use of hard material.

The cleats 27 may also be preformed and then adhered to the surface layer 10 as shown in Fig. 6.

Although specific embodiments have been shown for purposes of illustration, the invention may be applied to various uses as will be apparent to a person skilled in the art.

What is claimed is:

1. A conveyor belt comprising a pair of layers of a woven fabric, an intermediate polyurethane foam disposed between said fabric layers and bonding the same together, one of said fabric layers having a plurality of openings therein, and members composed of said polyurethane foam formed integrally with said intermediate layer extending through said openings, and projecting above the surface of said last mentioned fabric layer for positioning articles on said belt.

2. A conveyor belt comprising a pair of layers of woven fabric, a layer of parallel dimensionally stable filaments embedded in a layer of bonding polyurethane foam disposed between said fabric layers and bonding the same together, one of said fabric layers having a plurality of openings therein, and members composed of said polyurethane foam formed integrally with said polyurethane layer, extending through said openings and projecting above the surface of said last mentioned fabric layer to form positioning elements.

3. A conveyor belt as set forth in claim 2 in which said filaments comprise prestretched high tenacity rayon tire cord.

4. A conveyor belt as set forth in claim 2 in which said filaments comprise prestretched nylon tire cord.

References Cited in the file of this patent

UNITED STATES PATENTS

| | | |
|---|---|---|
| 814,943 | Cook | Mar. 13, 1906 |
| 1,287,703 | Lambert | Dec. 17, 1918 |
| 1,925,271 | Miller | Sept. 5, 1933 |
| 2,167,818 | Wagner | Aug. 1, 1939 |
| 2,325,903 | Blair et al. | Aug. 3, 1943 |
| 2,675,906 | Wagner | Apr. 20, 1954 |

FOREIGN PATENTS

| | | |
|---|---|---|
| 145,493 | Australia | Feb. 29, 1952 |
| 1,094,880 | France | Dec. 15, 1954 |
| 842,267 | Germany | Sept. 15, 1952 |